July 14, 1931.  R. H. McCAFFERTY  1,814,004
TROLLEY FROG
Filed June 16, 1930
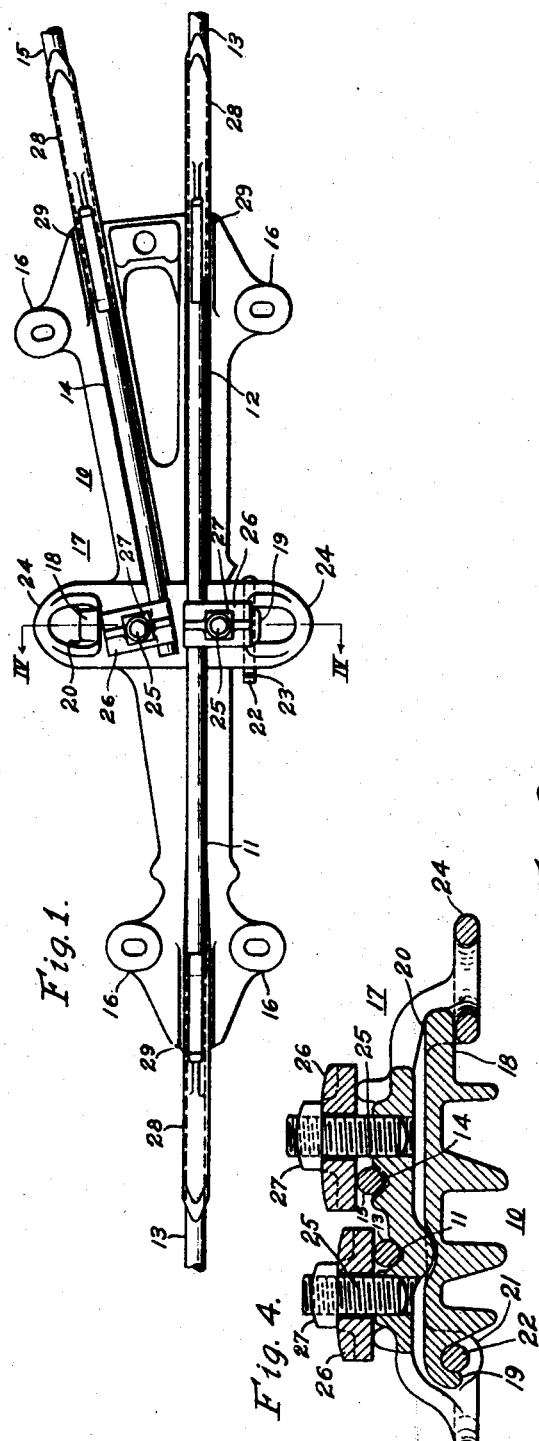
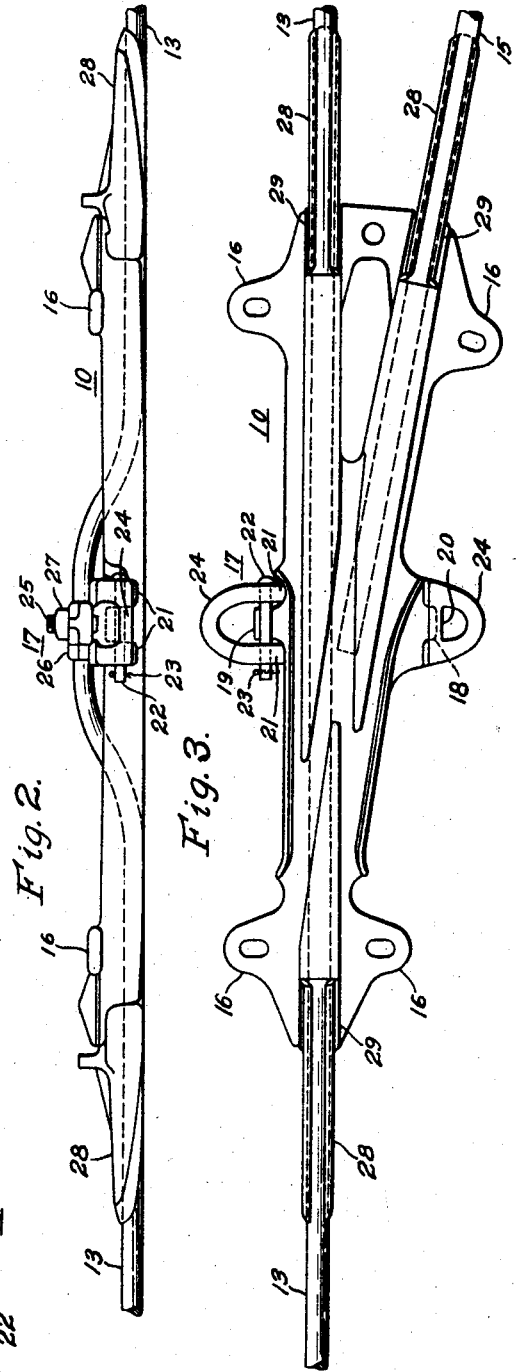
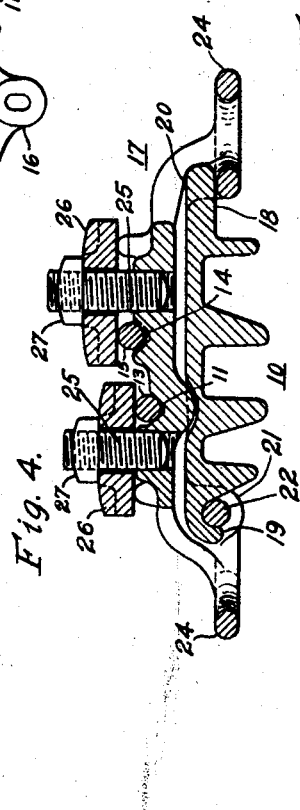
INVENTOR
Robert H. McCafferty.
BY
ATTORNEY Patented July 14, 1931

1,814,004

UNITED STATES PATENT OFFICE

ROBERT H. McCAFFERTY, OF WILKINSBURG, PENNSYLVANIA, ASSIGNOR TO WESTINGHOUSE ELECTRIC & MANUFACTURING COMPANY, A CORPORATION OF PENNSYLVANIA

TROLLEY FROG

Application filed June 16, 1930. Serial No. 461,344.

My invention relates to supporting devices for trolley conductors and more particularly to that class of conductor supports commonly known as trolley frogs or overhead switches.

An object of my invention, generally stated, is to provide a trolley frog which may be economically manufactured and readily installed.

A more specific object of my invention is to provide for detachably securing a removable trolley pan to a support member in such a manner that the trolley pan may be readily removed from the support member without disturbing the connections between the trolley wires and the support member.

For a fuller understanding of the nature and objects of my invention, reference may be had to the following detailed description, taken in conjunction with the accompanying drawings in which:

Figure 1 is a top plan view of a trolley frog constructed in accordance with my invention;

Fig. 2 is a view, in side elevation, of the frog illustrated in Fig. 1;

Fig. 3 is a bottom plan view of the frog; and

Fig. 4 is an enlarged sectional view, taken along the line IV—IV of Fig. 1, showing details of the construction.

Referring now to the drawings, the trolley frog, as shown, comprises a body member 10, commonly known to the trade as a trolley pan. It will be observed that the trolley pan 10 is provided with longitudinally extending grooves 11 and 12 for receiving a main trolley wire 13 and with an obliquely disposed groove 14 for receiving a branch wire 15. Eye members 16, to which guy wires may be attached to assist in retaining the pan in the correct position, are provided near each end of the pan 10. However this is not necessary and sometimes the pan is entirely supported by an anchor plate 17, which may be readily detached from the trolley pan 10.

In order that the anchor plate 17 may be readily attached to, or detached from the trolley pan 10, the pan is provided with two horizontally projecting lugs 18 and 19. As shown, the lug 18 is straight and is adapted to fit into a space 20 provided in the anchor plate 17, which is adapted to fit across the top of the pan 10. Referring to Fig. 4, it will be observed that the end portions of the anchor plate are so disposed below the level of the lugs 18 and 19 that the lug 18 may be readily inserted into the space 20. When the anchor plate 17 is in position on the pan 10, the lug 19, which is curved downwardly at its end, fits between two spaced jaws 21, provided on the anchor plate. A pin 22 may be inserted through holes provided in the jaws 21, and under the curved portion of the lug 19, thereby interlocking the anchor plate and trolley pan together. A cotter key 23 may be utilized to retain the pin 22 in position. Eye members 24 are provided at each end of the anchor plate 17 to which guy wires may be attached to support the anchor plate 17, which in turn supports the trolley pan 10.

It will be observed that the anchor plate 17 is provided with two vertically extending studs 25 on which clamps 26 are mounted. The clamps 26 are utilized for holding each trolley conductor separately in position on top of the anchor plate 17. The top ends of the studs 25 are threaded for receiving nuts 27 which retain the clamps 26 in position.

In order that the trolley wires may be retained in the grooves which are provided in the trolley pan, the ends of the pan are adapted to receive approach members 28. Each approach member is provided with a groove formed by bendable lips adapted to be clinched around the trolley wire. One end of the approach member is adapted to fit into a slot 29 formed by two spaced jaws provided on the ends of the trolley pan 10. The jaws are so shaped that the approach member is locked in position by the pressure of the trolley wire when the approach member is in its final position.

After the correct location for the trolley pan, which will permit a current collector to operate properly, has been determined, the trolley frog may be installed by attaching the anchor plate 17 to the trolley conductors 13 and 15 by means of the clamps 26. The anchor plate is placed in the desired position under the trolley wires and the clamps 26 are placed on top of the wires, which may then be clamped between the members 17 and 26 by means of the nuts 27. The guy wires may then be attached to the eye members 24 to support the trolley frog.

The ends of the approach members 28 may next be inserted in the slots 29, provided in the trolley pan, and the jaws of the approach members clamped around the trolley wires by means of a hammer or other tool. Guy wires may be attached to the eye members 16 to assist in retaining the trolley frog in correct alinement if desired.

It will be understood that an old trolley pan 10 may be readily removed and a new one put in its place by first removing the approach members 28 and then removing the pin 22 from the anchor plate 17. The old trolley pan will then drop out and a new pan may be placed in position by first inserting the lug 18 into the space 20 and then inserting the pin 22 through the holes in the anchor plate 17 and underneath the lug 19 on the trolley pan. The cotter key 23 may then be inserted in the pin 22 to retain it in position. The approach members 28 may be replaced and the guy wires attached to the eye members on the trolley pan. It is not necessary to disturb the connections between the anchor plate 17 and the trolley wires, or the anchor plate and the guy wires connected to the anchor plate, therefore the correct position for the trolley pan is retained.

Since numerous changes may be made in the above-described construction, and different embodiments of the invention may be made without departing from the spirit and scope thereof, it is intended that all matter contained in the above-description or shown in the accompanying drawings shall be interpreted as illustrative and not in a limiting sense.

I claim as my invention:

1. In a trolley frog, in combination, a trolley pan, an anchor plate for supporting the trolley pan, means for detachably securing a trolley wire on top of the anchor plate, and means for interlocking the anchor plate and trolley pan together to prevent relative movement thereof.

2. In a trolley frog, in combination, a trolley pan, an anchor plate for supporting the trolley pan, a clamp for detachably securing a trolley wire on top of the anchor plate, means for detachably securing the clamp to the anchor plate, and means for interlocking the anchor plate and trolley pan together to prevent relative movement thereof.

3. An anchor plate for supporting a trolley wire and a trolley pan comprising a body member having openings therein for receiving horizontally projecting lugs on the trolley pan, a pin for interlocking the anchor plate to the trolley pan, and a clamp for detachably securing the trolley wire on top of the anchor plate.

4. An anchor plate for supporting a trolley wire and a trolley pan comprising a body member having openings therein for receiving horizontally projecting lugs on the trolley pan to support the trolley pan, a pin for interlocking the anchor plate to the trolley pan, a clamp for detachably securing the trolley wire on top of the anchor plate, and means for detachably securing the clamp to the anchor plate.

5. An anchor plate for supporting a trolley wire and a trolley pan comprising a body member having openings therein for receiving horizontally projecting lugs on the trolley pan to support the trolley pan, a pin for interlocking the anchor plate to the trolley pan, a clamp for detachably securing the trolley wire on top of the anchor plate, means for detachably securing the clamp to the anchor plate, and eye members for securing supporting span wires to the anchor plate.

6. A trolley frog comprising, in combination, a trolley pan having horizontally projecting lugs, an anchor plate having recesses for receiving said lugs to support the trolley pan, a pin disposed to interlock the anchor plate and trolley pan together, a clamp for securing a trolley wire on top of the anchor plate, means for detachably securing the clamp to the anchor plate, and removable approach members for securing the wire to the trolley pan.

7. In a trolley frog, in combination, a trolley pan having two horizontally projecting lugs, an anchor plate for supporting the trolley pan, said anchor plate being so constructed that it may be hinged on the trolley pan by one of the projecting lugs and locked in position by a pin disposed to engage the other projecting lug on the pan.

In testimony whereof, I have hereunto subscribed my name this 10th day of June 1930.

ROBERT H. McCAFFERTY.